Oct. 18, 1955  H. FINZEL  2,720,841
SUBMERSIBLE SUMP PUMP
Filed Aug. 4, 1954

INVENTOR.
HERMAN FINZEL
BY Clarence E. Threshy
HIS ATTORNEY.

United States Patent Office 2,720,841
Patented Oct. 18, 1955

2,720,841

SUBMERSIBLE SUMP PUMP

Herman Finzel, Oak Park, Ill., assignor to Weil Pump Co., Chicago, Ill., a corporation of Illinois Application August 4, 1954, Serial No. 447,712

3 Claims. (Cl. 103—111)

This invention relates to certain improvements in submersible sump pumps and has for its principal object the provision of an improved construction of this character which will be highly efficient in use and economical in manufacture.

More specifically, among the salient objects of the invention is to provide in a submersible pump of this character a provision for trapping water seepage which otherwise would find exit into and through the bearings, resulting in the hardening and crystallization of the lubricant in the bearings, ultimately ruining or rendering defective the same.

Another and equally important object of the invention is to provide a simple arrangement for maintaining substantially dry the principal bearing of a sump pump, thus prolonging the life of the bearing and the effectiveness of the lubricant of the same.

It is a known fact in the art that unless a bearing is protected from water or water seepage, the lubricant ultimately becomes crystallized or hardened, resulting in damage of the bearing elements of the bearing. Under such conditions, as the bearing continues to function, the hardened or crystallized lubricant acts as an abrasive or grinder, ultimately reducing the bearing elements of an ineffective condition, resulting in bearing knocks and in throwing the shaft associated with the bearing out of alignment, thus not only damaging the bearing but also the shaft and other operating parts associated with the shaft, such for example the rotor of the motor, and also breaking down the motor insulation.

An object of this invention is to reduce to a minimum these above referred to difficulties.

Other objects will appear hereinafter.

The invention consists in the novel combination and arrangement of parts to be hereinafter described and claimed.

The invention will be best understood by reference to the accompanying drawings showing the preferred form of construction, and in which.

Figure 1:
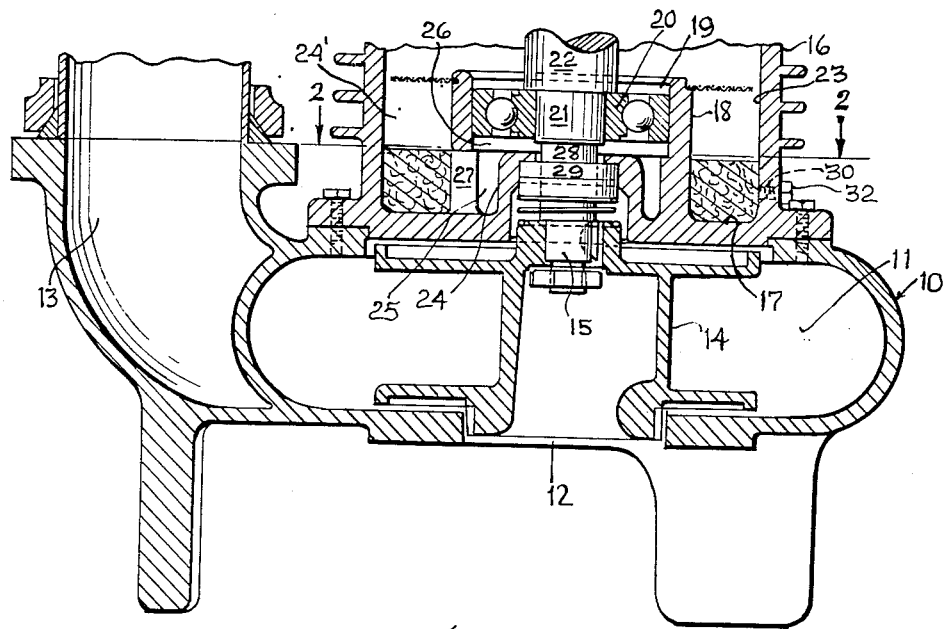
Fig. 1 is a fragmentary vertical cross-sectional detail view of a submersible pump having my improvements associated therewith.
Figure 2:
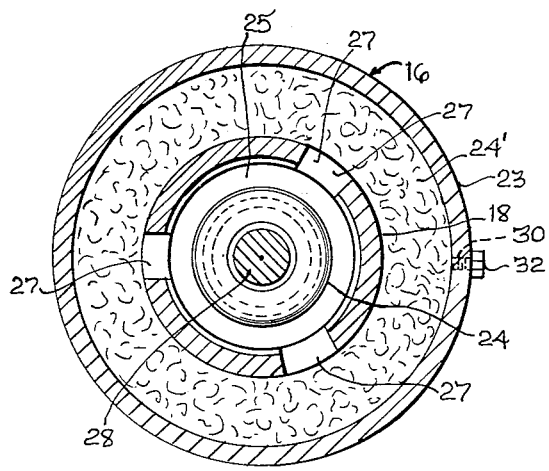
Fig. 2 is a sectional detail view taken substantially on line 2—2 of Fig. 1.

The several objects of my invention are accomplished by the preferred form of construction shown in the accompanying drawings.

In this connection the submersible pump shown comprises a base section 10 providing an impeller chamber 11 having an inlet 12 and an outlet 13. In this impeller chamber 11 is rotatably mounted an impeller 14. This impeller 14 is fixedly mounted on a shaft 15 driven by a suitable motor arranged within a motor casing 16. The motor casing 16 is separated from the base 10 by a partition 17. This partition 17 has a centrally located ring 18 providing a socket 19 within which is mounted a bearing 20 mounted on a reduced portion 21 of the upper portion 22 of the shaft 15. This ring 18 provides together with the adjacent wall 23 of the casing 16 a circular groove 24' within which is arranged an absorbent material, such for example as silicate gel, which will absorb and retain any water or moisture which finds entrance into the groove 24'.

Within the ring 18 is centrally located a sleeve 24. The sleeve 24 is spaced from the ring 18 to provide an annular groove 25 which communicates with a space 26 between the top of the sleeve 24 and the bearing 20. This space 26 as well as the groove 25 communicates with radially arranged openings 27 formed in the ring 18.

In the sleeve 24 and embracing a reduced portion 28 of the shaft 15 is a sealing structure 29 preferably of the well-known mechanical type. In one side wall of the casing 16 is an inspection opening 30 located below the top of the absorbent material and normally closed by a plug 32. This opening 30 serves principally as an inspection opening to determine the condition of the absorbent material.

Any seepage of water finding passage around the seal 29 will enter the space 26, drain therefrom into the space or groove 25, through the openings 27, and thence be absorbed and retained by the absorbent material within the groove 24'.

By this arrangement, no water seepage finds its way into the bearing 20 or the motor, particularly its winding. The bearing 20 is thus protected from any water seepage, as is the motor. Consequently, not only is the life of the bearing prolonged, but also the effectiveness of the lubricant. After a test run of the submersible pump the plug 32 can be removed, at which time it can be ascertained whether any water seepage has found its way around the seal 29.

My invention is highly effective for its intended purpose, and its value can be appreciated when it is understood that the pump is usually located in a submerged condition within a well or the like.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A submersible pump in which there is an impeller chamber and a shaft carrying an impeller operable in the chamber, a casing having a partition separating the casing from the impeller chamber and providing a sleeve surrounding said shaft, a seal between said shaft and said sleeve, a ring surrounding said sleeve and providing a groove between the ring and the walls of the casing and a groove between the ring and the sleeve, a bearing structure within the ring above and in spaced relation with respect to the sleeve and surrounding said shaft, said ring having formed in its base at least one opening of a size equal in height to said sleeve providing communication between said grooves and the space between said bearing structure and said sleeve, and an absorbent member arranged in the groove provided between the ring and the adjacent walls of the casing.

2. A submersible pump in which there is an impeller chamber and a shaft carrying an impeller operable in the chamber, a casing having a partition separating the casing from the impeller chamber and providing a sleeve surrounding said shaft, a seal between said shaft and said sleeve, a ring surrounding said sleeve and providing a groove between the ring and the walls of the casing and a groove between the ring and the sleeve, a bearing structure within the ring above and in spaced relation with respect to the sleeve and surrounding said shaft, said ring having formed in its base at least one opening of a size equal in height to said sleeve providing communication between said grooves and the space between said bearing structure and said sleeve, an absorbent member arranged in the groove provided between the ring and the adjacent walls of the casing, the walls of said casing having an inspection opening communicating with the groove provided between the ring and the walls of the casing, and a removable plug for said inspection opening.

3. A submersible pump in which there is an impeller chamber and a shaft carrying an impeller operable in the chamber, a casing having a partition separating the casing from the impeller chamber and providing a sleeve surrounding said shaft, a seal between said shaft and said sleeve, a ring surrounding said sleeve and providing a groove between the ring and the walls of the casing and a groove between the ring and the sleeve, a bearing structure within the ring above and in spaced relation with respect to the sleeve and surrounding said shaft, said ring having formed in its base at least one opening of a size equal in height to said sleeve providing communication between said grooves and the space between said bearing structure and said sleeve, the walls of said casing having an inpection opening communicating with the groove provided between the ring and the walls of the casing, and a removable plug for said inspection opening.

References Cited in the file of this patent

UNITED STATES PATENTS

| | | |
|---|---|---|
| 1,989,104 | Mendenhall et al. | Jan. 29, 1935 |
| 2,320,708 | Yost | June 1, 1943 |